United States Patent Office 2,923,479
Patented Feb. 2, 1960

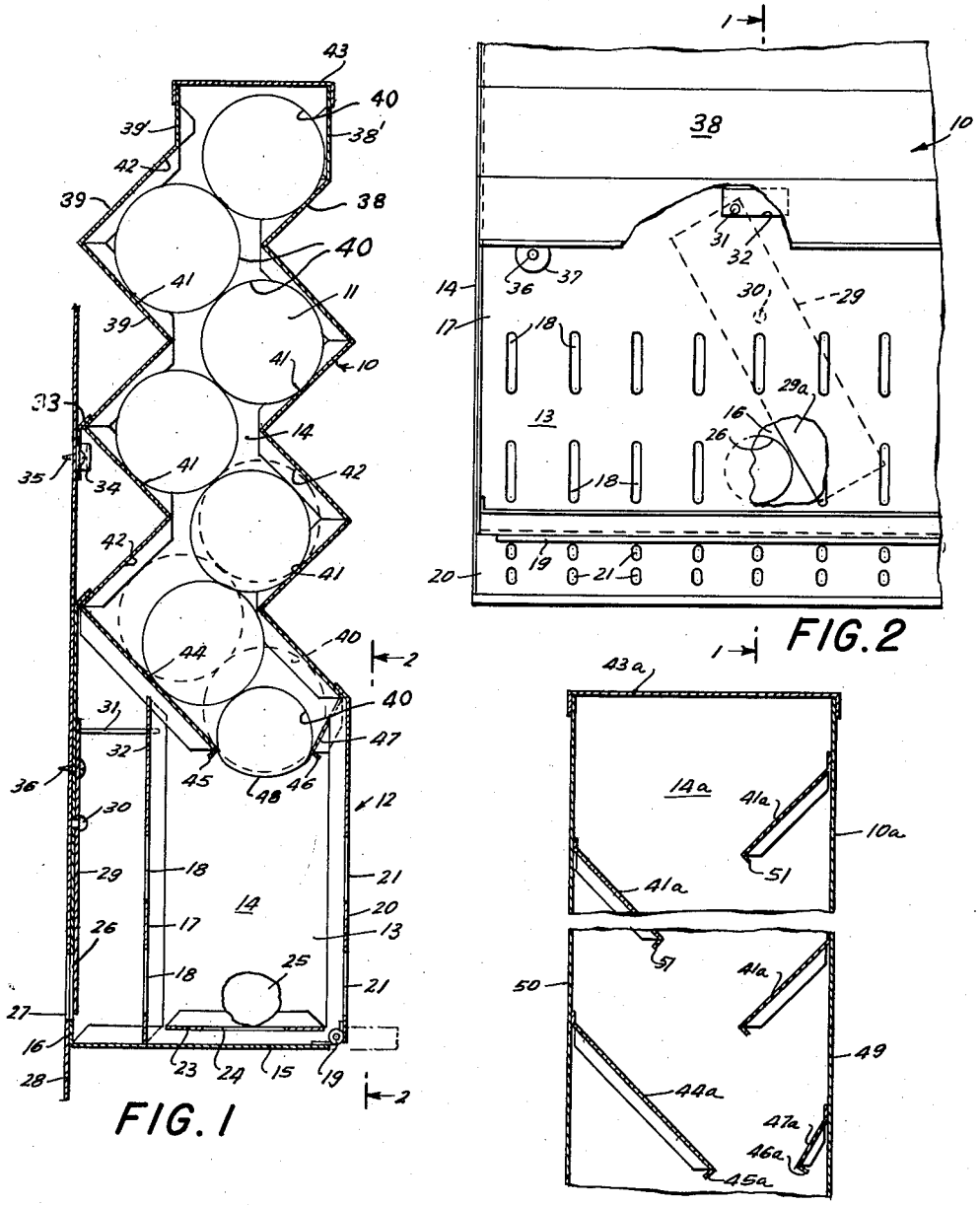

2,923,479

DISPENSING DEVICE FOR MULTIPLE CYLINDRICAL SLUGS OF AIR TREATING GEL

Charles B. Wenner, Darien, Conn., and Aurelio Dello Russo, Bronx, N.Y., assignors to Airkem, Inc., New York, N.Y., a corporation of New York Application August 28, 1957, Serial No. 680,769

4 Claims. (Cl. 239—57)

This invention relates to a dispensing and vapor diffusing device for utilizing air treating gel in cylindrical slug form particularly adapted to large scale installations in which a substantial number of horizontally disposed gel slugs are charged to the device at one time to provide prolonged unattended operation thereof. More particularly the invention relates to a device of the character described having means for guiding the relative movement of gel slugs within the device so as to prevent substantial build-up of pressure on the gel slugs in the lower portion of the device.

This dispensing device in accordance with the present invention constitutes a modification and improvement in the vaporizing dispenser for air treating gels disclosed in prior patent of one of us No. 2,733,956, dated February 7, 1956, which modification is particularly adapted for use in large scale installations where a substantial number i.e. four or more, gel slugs are intended to be charged to the device at one time. The present invention embodies the basic principles of said prior patent whereby the lowermost horizontally disposed cylindrical gel slug engages an elongated opening, the sides of which are spaced apart substantially less than the original diameter of a gel slug.

Air treating gels for use in the device are preferably of the type disclosed in United States Patent No. 2,691,615 wherein an aqueous medium containing 1 to 10% of a mixture of volatile air treating components is solidified by means of a small amount i.e. 1 to 4% of an aqueous gelling agent. As volatilizable materials escape from the exposed surface of the lowermost gel slug, the slug undergoes gradual shrinkage until its diameter is sufficiently reduced to permit passage through the restricted opening. The slug thus dropped through the restricted opening falls into a chamber or zone for continued evaporation of volatilizable materials therefrom while a portion of the next higher gel slug becomes exposed at the restricted opening and commences to evaporate and shrink in the manner described.

The device as disclosed in said prior Patent No. 2,733,956 embodies a storage chamber for air treating gel slugs in which a plurality of gel slugs are arranged one above the other in vertical alignment with said restricted opening. While this arrangement has proved very effective in various adaptations of the device, it is found that when more than about three or four gel slugs are thus arranged in vertical alignment one above the other, the accumulated weight of the upper gel slugs on the lowermost gel slug tends to modify the performance of the device by introducing pressure as a factor influencing the timing of drop-through of partially consumed gel slugs. When a gel slug is prematurely dropped due to the influence of pressure, the effect is to introduce into the volatilization chamber gel bodies having a total surface for evaporation greater than intended in normal operation of the device, with the result that there will be substantial variation in the amount of volatilizable material introduced into air circulating through said chamber.

When air treating gel is utilized to deodorize and freshen air in large scale installations, such as duct-type air conditioning systems, or central air conditioning units servicing a substantial area, it is important that the rate of volatilization and introduction of volatilizable materials into circulating air be maintained within particular desired limits without substantial fluctuation. At the same time, it is important that a dispenser for air treating gel in such large scale installations have a capacity such as to enable unattended operation.

The modified improved device in accordance with the present invention obviates the difficulties above mentioned, and provides a structure which can be extended vertically to any extent desired, thereby increasing the capacity and time of unattended operation of the device, without having performance of the device influenced by a build-up of pressure.

Regarded in certain of its broader aspects the improved dispensing device in accordance with the present invention embodies a vertically disposed storage chamber for a plurality of cylindrical gel slugs terminating at its lower end in a restricted discharge opening engaging side edges of a cylindrical gel slug, wherein said storage chamber is provided with baffle means guiding the second lowermost gel slug in a path disposed angularly to the direction of drop-through of the lowermost gel slug, and for guiding successive gel slugs above said second lowermost gel slug in alternating angularly disposed paths. The baffle means are preferably disposed at alternate angles approximately 45° from the vertical. The inclination of the baffle means should not be greater than 45° from the vertical, although it can, if desired, be somewhat less than 45° from the vertical as more fully hereinafter described.

The invention will be readily understood from a consideration of the following description taken together with the accompanying drawing in which preferred adaptations of the invention have been illustrated with various parts thereof identified by suitable reference characters in each of the views, and in which:

Fig. 1 is a vertical sectional view of one form of my gel dispensing device as viewed from one side thereof;

Fig. 2 is a front elevation view of a portion of the device as shown in Fig. 1 looking in the direction of the arrows 2—2 with part of the structure broken away to show concealed detailing; and Fig. 3 is a view similar to the upper portion of Fig. 1 showing a modified structure of the gel storage chamber thereof.

As shown in the drawing, the dispenser and diffuser device for air treating gel comprises an upper casing 10 forming a storage chamber 11 for elongated cylindrical bodies of air treating gel, and a lower casing 12 forming a volatilization chamber 13 for receiving gel slugs discharged from the chamber 11. Side walls 14 of the device are suitably unitary members comprising side closures for both of the chambers 11 and 13. The side walls 14 are joined together by a bottom wall 15, a rear wall 16, and a baffle member 17 having a plurality of apertures 18 for circulation of air therethrough. Pivotally secured to the bottom wall 15 as by a hinge 19 is a front wall or closure part 20 providing access to the chamber 13 and having apertures 21 similar to the apertures 18 providing for circulation of air therethrough. The lower portion of the chamber 13 is also preferably provided with a shelf 23 having apertures 24 therein for receiving partially spent gel slugs 25 and supporting same in position to provide free circulation of air around them.

The rear wall 16 is provided with a hole or aperture 26 which is in alignment with a similar aperture 27 in the wall 28 of an air conditioning duct or other unit with which the device is to be used. The wall 16 also pivotally supports a control plate 29 having a lower end 29a registering with the aperture 26 and adapted for variable blocking of the aperture 26 as the plate 29 is rotated about its pivot or axis 30. The upper end of the plate 29 is provided with a forwardly extending finger-piece 31 which protrudes through an aperture 32 in the baffle member 17 to facilitate angular movement of the plate 29 in controlling the effective opening of the aperture 26. It will be noted that the control thus placed inwardly of the device is particularly advantageous when frequent adjustments of the effective size of the aperture 26 are to be made, and a temper-proof device is desired. It is to be understood, however, that any suitable means can be provided for varying the effective size of the aperture 26 with the control therefor either internally or externally of the device.

The device is secured to the wall 28 of an air conditioning duct or the like, by any suitable means, such as a flange 33 secured to the upper casing 10, engaging a strap 34 secured to the wall 28 by screws or other fasteners 35. Additional screws 36 can be passed through the walls 16 and 28, and for this purpose, suitable cut-outs 37 are provided in the baffle 17 to provide access to the screws 36.

The side walls 14 in the upper casing part 10 of the device are secured together by a corrugated front wall 38 and a corrugated rear wall 39 with said corrugations being of a size, and the walls 38 and 39 being spaced apart, to provide a zig-zag path guiding the downward movement of the cylindrical gel slugs 40 of a predetermined size. As shown in the drawing, these corrugations are arranged at 45° to the vertical providing at alternate sides of the chamber 10, lower bearing or baffle surfaces 41 which actually support and guide the gel slugs 40 in their downward movement. The angle of the surfaces 41 should not be greater than 45° from the vertical, but can, if desired, be somewhat less than 45°, although preferably not less than about 35° from the vertical. The spaced upper surface portions 42 of the walls 38 and 39 merely serve to close the storage chamber 10, and normally do not contact the gel slugs 40 in their downward movement through the device. The upper ends of the walls 38 and 39 terminate in vertically disposed portions 38' and 39' which together with upper edges of the side walls 14 form an access opening for filling the device which is normally closed by means of a removable cover 43.

Adjacent the lower edge of the rear wall 39 and extending downwardly therefrom in a direction parallel to the surfaces 41 of said rear wall is a lower baffle member 44 which is somewhat longer than the baffle surfaces 41 as will be apparent from the drawing. The lower edge of the baffle 44 is provided with an inturned lip 45 in horizontal alignment with the corresponding lip 46 of another baffle plate 47 adjacent the lower edge of the front wall 38. The baffles 44 and 47 and the inturned edges 45, 46 thereof thus provide a restricted passage for retaining a gel slug 40 until it has been substantially consumed and shrunk through evaporation of volatile materials from the lower exposed surface 48 thereof.

The three lowermost gel slugs 40 have been shown in both full and dotted lines, the full line showing corresponding to the relative position of the gel slugs just prior to the dropping of the lowermost gel slug, and the dotted line position indicating the relative position of the gel slugs just after the slug has been dropped and the remaining slugs have advanced to a lower position. It will be evident from a consideration of these full and dotted line showings of the gel slugs 40 that forces upon the lowermost gel slug are confined to forces due to the weight of the lowermost and the second and third lowermost gel slugs, since there is virtually no movement of the fourth lowermost gel slug during the time that the lowermost gel slug shrinks from its initial size as indicated in dotted lines to the size when it drops through the opening as indicated in full lines.

The spacing of the flanged edges 45 and 46 forming the elongated drop-through passage should be approximately three-quarters of the diameter of the particular gel slugs charged to the device. Thus, for example, if the gel slugs 40 are initially 2" in diameter, the spacing of the edges 45, 46 should be approximately one-and-one-half inches. With the angular delivery of gel slugs to the opening 45—46, it is important that the baffle 47 be disposed at a somewhat lesser angle to the vertical than the other baffle surfaces 41. When the baffles 41 are arranged at 45° to the vertical as shown in the drawing, the baffle 47 should be approximately 30° to the vertical (about 15° less than the baffle 41). If the angularity of the baffles 41 is reduced from 45° to say 40 or 35° from the vertical, the difference in angularity of the baffle 47 will be reduced to about 12° and 10° respectively.

With the 45° angularity arrangement of the baffles 41, it will be evident that except in the case of the three lowermost gel slugs, the downward force of a particular gel slug on the next lower slug is transmitted therethrough perpendicularly to the surface or baffle 41 supporting same. As the angularity of the baffles 41 is decreased to lesser angles from the vertical, it will be evident that a similar force would not be transmitted perpendicularly to the surface of the baffles 41, and to the extent that such force was not perpendicular to the baffles 41, an increased accumulated force is applied to the lower gel slugs as more slugs are added to the device. Accordingly, the extent to which it is permissible to reduce the angularity from the vertical of the baffles 41 depends upon the number of gel slugs to be accommodated in the device, and the degree to which accumulated force due to the weight of such gel slugs can be tolerated in performance of the device. The performance and advantage for the 45° angle in the baffles 41 is that the accumulation of force is limited to the three lowermost gel slugs, and that the heights of the device and number of gel slugs accommodated in the storage compartment 10 can be increased to any extent desired without affecting performance of the device.

The modified construction in Fig. 3 of the drawing shows an upper casing part 10a having side walls 14a which could be continuations of the lower portions of the side walls 14 as shown in Fig. 1. The front wall 49 and rear wall 50 of the container part 10a are parallel sheets spaced apart a distance substantially to that of the overall depth of the container part 10 as shown in Fig. 1. Extending between the end walls 14a and secured thereto and to the respective front and rear walls are angularly disposed baffles 41a which correspond in size and arrangement with the baffle surfaces 41 as shown in Fig. 1 of the drawing. The lowermost baffle secured to the rear wall 50 and identified as 44a correspond in size and location with the baffle 44 as shown in Fig. 1 and terminates in an inturned flange 45a. The lowermost baffle 47a secured to the front wall 49 similarly corresponds to the baffle 47 as shown in Fig. 1 and terminates in an inturned flange 46a. The angular arrangement of the baffle 47a and the spacing of the inturned flanges 45a, 46a forming the drop-through passage for the device, are the same as described with the respective parts in connection with Fig. 1 of the drawing, and the upper end of the casing part 10a is provided with a removable cover 43a which is obviously somewhat larger than the cover 43 as shown in Fig. 1 of the drawing.

The cylindrical gel slugs assume the same pattern with the storage compartment as shown in Fig. 3 of the drawing, and will feed downwardly as a partially consumed gel slug is dropped through the opening 45a, 46a in the same manner as described in connection with Fig. 1 of the drawing. The construction as shown in Fig. 3 of the drawing has the advantage of greater simplicity and lower production cost than the device as shown in Fig. 1 of the drawing. There is, of course, in the device as shown in Fig. 3, substantially greater free space, unoccupied by gel slugs, but this is not objectionable, providing a rather close fitting cover 43a is employed, since the lower discharge opening 45a, 46a will at all times be substantially closed by a gel slug supported in this opening. In other words, since there is no circulation of air into the device, the existence of additional free space is of no real consequence.

In the device as shown in the drawing and in the modifications thereof within the scope of the foregoing description, it is to be noted that the lower edge of each of the baffle members 41 or 41a is spaced from the plane of the next lower and opposed baffle a distance such as just to provide free clearance of a gel slug of predetermined diameter. For practical purposes, since the fresh gel slug has considerable resilience, this distance or spacing can be substantially the diameter of the gel slug. Thus, for example, for a 2" gel slug, a 2" spacing is quite satisfactory. A spacing substantially greater than the diameter of the gel slug is to be avoided, since the relatively close fit of the gel between opposed baffles 41 or 41a is an element contributing to proper alignment and feed of the gel slugs, particularly in initial filling of the container part, or refilling the same when gel slugs have been substantially consumed. In this connection, it will be noted that the lower edges of the baffles 41a as shown in Fig. 3 are provided with inturned flanges 51 which serve to protect the gel slugs from cutting or other damage as they move from one baffle to the other.

Various changes and modifications in the device as herein disclosed will occur to those skilled in the art, and to the extent that such changes and modifications are embraced by the appended claims, it is to be understood that they constitute part of my invention.

We claim:

1. In a dispensing and vapor diffusing device for predetermined diameter ($d$) cylindrical slugs of air treating gel which is semi-solid and which undergoes shrinkage as volatile components evaporate therefrom, said device comprising a vertically elongated container of essentially rectangular cross-sectional form having an upper container part for storage of more than three horizontally disposed gel slugs and accessible through a detachable top wall for said container, a lower container part having apertured walls for circulation of air therethrough, and inwardly projecting means between said upper and lower container parts and extending transversely of the container between opposed end walls thereof providing a discharge passage having a width equivalent to approximately three-fourths the diameter ($d$) of said gel slugs, whereby a gel slug in engagement with said discharge passage is permitted to drop therethrough only after substantial shrinkage through evaporation of volatile components from said gel slug, the improvement for nullifying the effect of pressure on passage of gel slugs through said discharge passage when more than three gel slugs are stored in said upper container part which comprises a first series of essentially planar baffle members uniformly spaced vertically and inclined downwardly along the rear wall of said container part at a common angle approaching, but not greater than, 45° from the vertical, a second series of essentially planar baffle members similarly spaced vertically and inclined downwardly along the front wall of said container part in uniformly staggered relation to said first series of baffle members, the distance between the plane of each baffle member and the lower edge of the next higher baffle of the opposed series being very slightly greater than the diameter ($d$) of the gel slugs to permit close but free passage of gel slugs therebetween, whereby successive gel slugs resting on said baffles are alternately staggered forwardly and rearwardly of said container part in a zig-zag pattern, the lowermost baffle of said first series being wider than all other baffles in said series to simultaneously engage the two lowermost gel slugs and having its lower edge in horizontal alignment with a smaller baffle below said second series of baffles to provide said discharge passage, and said smaller baffle having a lesser inclination from the vertical than all other baffles to dispose said two lowermost gel slugs in positions slightly forwardly of the corresponding gel slugs higher in said zig-zag pattern.

2. An improvement in a dispensing and vapor diffusing device as defined in claim 1 wherein said series of baffle members constitute integral parts of corrugated front and rear walls for the upper container part of said device.

3. An improvement in a dispensing and vapor diffusing device as defined in claim 1 wherein said baffle members constitute separate rigid members secured to and projecting from essentially flat front and rear walls of the upper container part of said device.

4. An improvement in a dispensing and vapor diffusing device as defined in claim 1 wherein the last named smaller baffle is inclined approximately 30° from the vertical.

References Cited in the file of this patent
UNITED STATES PATENTS

| | | |
|---|---|---|
| 1,981,272 | Kuhn et al. | Nov. 20, 1934 |
| 2,733,956 | Wenner | Feb. 7, 1956 |
| 2,789,727 | Singleton | Apr. 23, 1957 |